(12) United States Patent
Patterson et al.

(10) Patent No.: US 9,776,890 B1
(45) Date of Patent: Oct. 3, 2017

(54) SANITIZING SYSTEM

(71) Applicant: JB Solutions, Inc., Southampton, MA (US)

(72) Inventors: Brian Patterson, Easthampton, MA (US); James Patterson, Southampton, MA (US)

(73) Assignee: JB Solutions, Inc., Southampton, MA (US)

( * ) Notice: Subject to any disclaimer, the term of this patent is extended or adjusted under 35 U.S.C. 154(b) by 0 days.

(21) Appl. No.: 15/437,704

(22) Filed: Feb. 21, 2017

Related U.S. Application Data

(60) Provisional application No. 62/297,588, filed on Feb. 19, 2016, provisional application No. 62/371,415, filed on Aug. 5, 2016.

(51) Int. Cl.
| | |
|---|---|
| *F24F 3/16* | (2006.01) |
| *C02F 1/50* | (2006.01) |
| *C02F 1/00* | (2006.01) |
| *F24F 11/00* | (2006.01) |
| *F24F 3/00* | (2006.01) |
| *F24F 3/14* | (2006.01) |
| *C02F 1/68* | (2006.01) |
| *F24F 13/22* | (2006.01) |
| *F24F 6/00* | (2006.01) |
| *C02F 1/76* | (2006.01) |

(52) U.S. Cl.
CPC ............. *C02F 1/008* (2013.01); *C02F 1/50* (2013.01); *C02F 1/686* (2013.01); *F24F 3/001* (2013.01); *F24F 3/14* (2013.01); *F24F 3/16* (2013.01); *F24F 11/0012* (2013.01); *C02F 1/76* (2013.01); *C02F 2303/04* (2013.01); *C02F 2303/20* (2013.01); *F24F 2003/1675* (2013.01); *F24F 2006/006* (2013.01); *F24F 2013/228* (2013.01)

(58) Field of Classification Search
CPC .. C02F 1/008; C02F 1/686; C02F 1/76; C02F 1/50; C02F 2303/04; C02F 2303/20; F24F 3/001; F24F 3/14; F24F 3/16; F24F 11/0012; F24F 2003/1664; F24F 2003/1675; F24F 2006/006; F24F 2013/228
See application file for complete search history.

(56) References Cited

U.S. PATENT DOCUMENTS

| 3,990,855 A | 11/1976 | Cort et al. |
| 4,789,467 A | 12/1988 | Lindsay et al. |

(Continued)

FOREIGN PATENT DOCUMENTS

| EP | 2085711 | 8/2003 |
| EP | 1939543 | 7/2008 |

(Continued)

*Primary Examiner* — Terry Cecil
(74) *Attorney, Agent, or Firm* — Doherty, Wallace, Pillsbury & Murphy, P.C.

(57) ABSTRACT

A sanitizing system for water treatment in appliances that use or that have an associated water cycle where sanitization of the water in the water cycle is beneficial. The system comprises a controller, a biocide, and a biocide injection subsystem, wherein the controller provides a signal to the injection subsystem to release a biocide into a water reservoir contained within the appliance, and further wherein the signal provided by the controller is in response to a signal received by the controller from the appliance.

14 Claims, 9 Drawing Sheets

(56) References Cited

U.S. PATENT DOCUMENTS

| | | | |
|---|---|---|---|
| 5,049,801 A * | 9/1991 | Potter | F24F 11/0001 |
| | | | 236/49.3 |
| 5,294,916 A | 3/1994 | Bolton et al. | |
| 5,514,344 A | 5/1996 | D'Agaro | |
| 6,487,867 B1 * | 12/2002 | Herren | B08B 9/08 |
| | | | 62/126 |
| 6,892,907 B2 | 5/2005 | Varney | |
| 7,392,658 B1 | 7/2008 | Hardy, III | |
| 7,640,759 B2 | 1/2010 | Robinson | |
| 7,686,034 B1 | 3/2010 | Coogle | |
| 7,740,025 B2 | 6/2010 | Scaringe | |
| 7,857,004 B2 * | 12/2010 | Pearson | B60H 1/3233 |
| | | | 137/240 |
| 8,475,603 B2 | 7/2013 | Kaiser | |
| 8,840,729 B1 | 9/2014 | Herren et al. | |
| 9,289,803 B1 | 3/2016 | Parks | |
| 2003/0056812 A1 | 3/2003 | Baker et al. | |
| 2008/0053134 A1 | 3/2008 | Sakashita et al. | |
| 2010/0012291 A1 * | 1/2010 | Sporie | F24F 5/0035 |
| | | | 165/61 |
| 2013/0239991 A1 | 9/2013 | Deavir et al. | |
| 2014/0116530 A1 | 5/2014 | Pearson | |
| 2015/0048034 A1 | 2/2015 | Reinolds | |
| 2016/0138816 A1 * | 5/2016 | Flaxer | F24F 6/02 |
| | | | 236/44 R |

FOREIGN PATENT DOCUMENTS

| | | |
|---|---|---|
| ES | 2190837 | 8/2003 |
| WO | WO 2006105017 | 10/2006 |

* cited by examiner

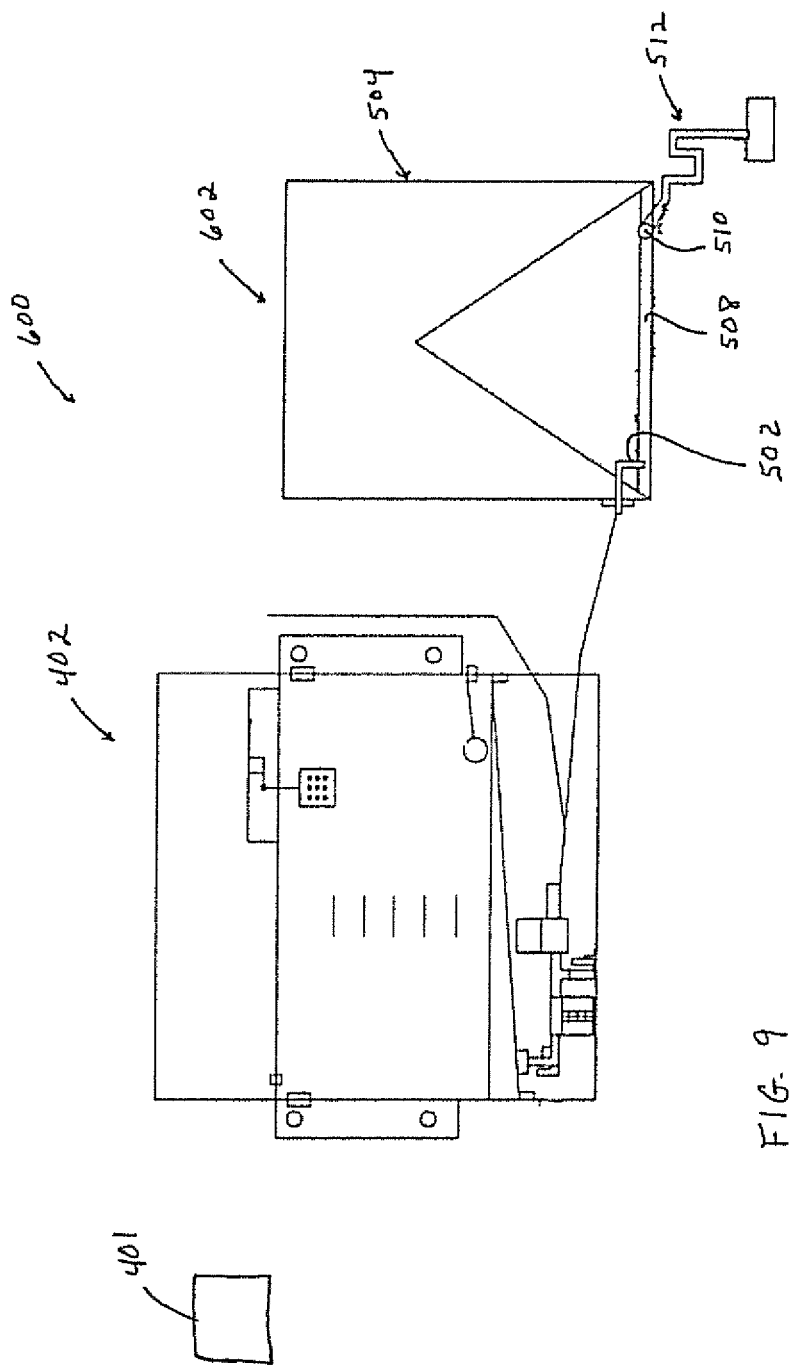

US 9,776,890 B1

SANITIZING SYSTEM

BACKGROUND OF THE INVENTION

1. Field of the Invention

The invention disclosed herein relates to condensate producing appliances, and, in particular, to systems for sanitizing the condensate produced in such appliances.

2. Description of the Related Art

Bacterial, viral and fungal growth is promoted in areas where moisture is present. In the average home, this growth can form in many of the home's heating, ventilation and air-conditioning ("HVAC") systems and humidification equipment, and with direct access to the home's central air delivery system, these viruses and bacteria can become air-born. Common air-born derived illnesses, from *Legionella* and *Aspergillus* bacteria, for example, have been directly related to improperly maintained humidifier systems and other HVAC equipment drainage systems. There are many more opportunities for such biological contaminant growth in commercial and industrial settings.

What is needed, therefore, are methods and apparatuses that eliminate unwanted bacterial growth and associated odors, and that can prevent drain overflows and system contamination from blockages of microbial build-up in HVAC systems or in HVAC-like systems. Further needed are methods and apparatuses that can recycle or repurpose the water that runs through these systems in a safe and efficient manner.

SUMMARY OF THE INVENTION

Disclosed herein is a sanitizing system for water treatment in appliances that involve condensate. Examples of such appliances include air conditioners, dehumidifiers, humidifiers, vaporizers, ice machines, refrigeration units and the like. Generally, the sanitizing system includes a controller, a supply of biocide, and a biocide injection subsystem. Other components may be included as needed to provide for the intended functionality described herein.

Generally, the controller includes a system interface that provides for retrofit of an existing appliance, or may be incorporated into a device as original equipment. Among other things, the controller monitors operations of the appliance and provides for periodic injection of suitable forms of biocide into the condensate via the injection subsystem based upon one or more signals directly received from the appliance itself. By using an appropriately configured controller, it is possible to use minimal quantities of biocide and obtain efficient sanitization of the water cycle associated with the appliance.

In an exemplary embodiment, the sanitizing system comprises an appliance having a water cycle; a controller comprising a receiver and an actuator; a biocide; and a biocide injection subsystem. The appliance transmits an input signal to the receiver of the controller, wherein the input signal is used by the controller to create a secondary input signal which the controller transmits to the actuator, wherein the actuator then generates an output signal based upon the secondary input signal, wherein the output signal actuates the biocide injection subsystem to cause the release of the biocide into the water cycle of the appliance. In an exemplary embodiment, the appliance comprises an air conditioning unit, and wherein the input signal is generated and transmitted to the receiver by the air conditioning unit's thermostat. In another exemplary embodiment, the appliance comprises a humidifier having a fill valve, wherein the fill valve generates the input signal and transmits the input signal to the receiver of the controller.

In another exemplary embodiment, the sanitizing system comprises a heating, ventilation, and air-conditioning subsystem which generates a first cooling input and a second cooling input; a controller comprising a receiver and an actuator, wherein the receiver receives at least one of the first cooling input and the second cooling input, and further wherein, upon receipt of at least one of the first cooling input and the second cooling input, the receiver generates a secondary input signal and transmits the secondary input signal to the actuator, wherein the actuator then generates an output signal; a biocide; and a biocide injection subsystem, wherein the biocide injection subsystem causes the flow of biocide into the heating, ventilation, and air-conditioning subsystem based upon the output signal generated by the actuator of the controller and transmitted to the biocide injection subsystem by the actuator. In this embodiment, the first cooling input is transmitted to the receiver when the heating, ventilation, and air-conditioning subsystem is running at a low speed, and the second cooling input is transmitted to the receiver when the heating, ventilation, and air-conditioning subsystem is running at a high speed.

BRIEF DESCRIPTION OF THE DRAWINGS

The features and advantages of the invention are apparent from the following description taken in conjunction with the accompanying drawings in which:

FIG. 9 is a schematic depicting an exemplary sanitizing system comprising the gravity feed storage tank depicted in FIG. 5 and an exemplary air conditioning unit.

DETAILED DESCRIPTION OF THE INVENTION

Before describing the invention in detail, as a preliminary matter, as used herein, the term "biocide" generally refers to a chemical agent suited for killing bacteria and other biota within a water cycle associated with an appliance. The biocide may be provided in various forms and disposed into the water cycle by application of the methods and apparatuses described herein.

As used herein, the term "water cycle" and other similar terms generally refers to water and/or humidity that may be generated incidental to or as a part of operation of an appliance. The water cycle may include condensate, a reservoir, a stream of vapor, or other form of water.

As used herein, the term "appliance" generally refers to a device that uses or has an associated water cycle where sanitization of the water cycle may be deemed beneficial. The appliance may be a heating, ventilation, and/or air conditioning device. The appliance may be designed to affect ambient humidity, and be provided as, for example, a humidifier, a dehumidifier, or other such device.

As used herein, the term "sanitize" in its various forms, generally refers to adequate reduction of pathogens such as bacteria as may be contained in, associated with or derived from a water cycle of a particular appliance. The degree of adequacy may be determined by a user, designer, manufacturer, regulator or other similarly interested party.

Disclosed herein is a sanitizing system for water treatment in appliances that involve condensate. Such appliances include, for example and without limitation, air conditioners, dehumidifiers, humidifiers, vaporizers, ice machines, refrigeration units and the like. Generally, the sanitizing system includes a controller, a supply of biocide, and an injection subsystem. Other components may be included as needed to provide for the intended functionality described herein.

Generally, the controller includes a system interface that provides for retrofit of an existing appliance, or may be incorporated into the appliance as original equipment. Among other things, the controller monitors operations of the appliance and provides for periodic injection of suitable forms and amounts of biocide into the water cycle. By using an appropriately configured controller, it is possible to use minimal quantities of biocide and obtain efficient sanitization of the water cycle associated with the appliance.

In operation, the controller is specially designed to determine the time at which a biocide is to be introduced into the water cycle. The controller further is designed to control the duration of the biocide's flow into the water cycle. To these ends, in an exemplary embodiment, the controller includes software capable of calculating the optimal time at which to introduce the biocide into the water cycle and which further is capable of determining when the output of biocide into the water cycle should stop.

Figure 1:
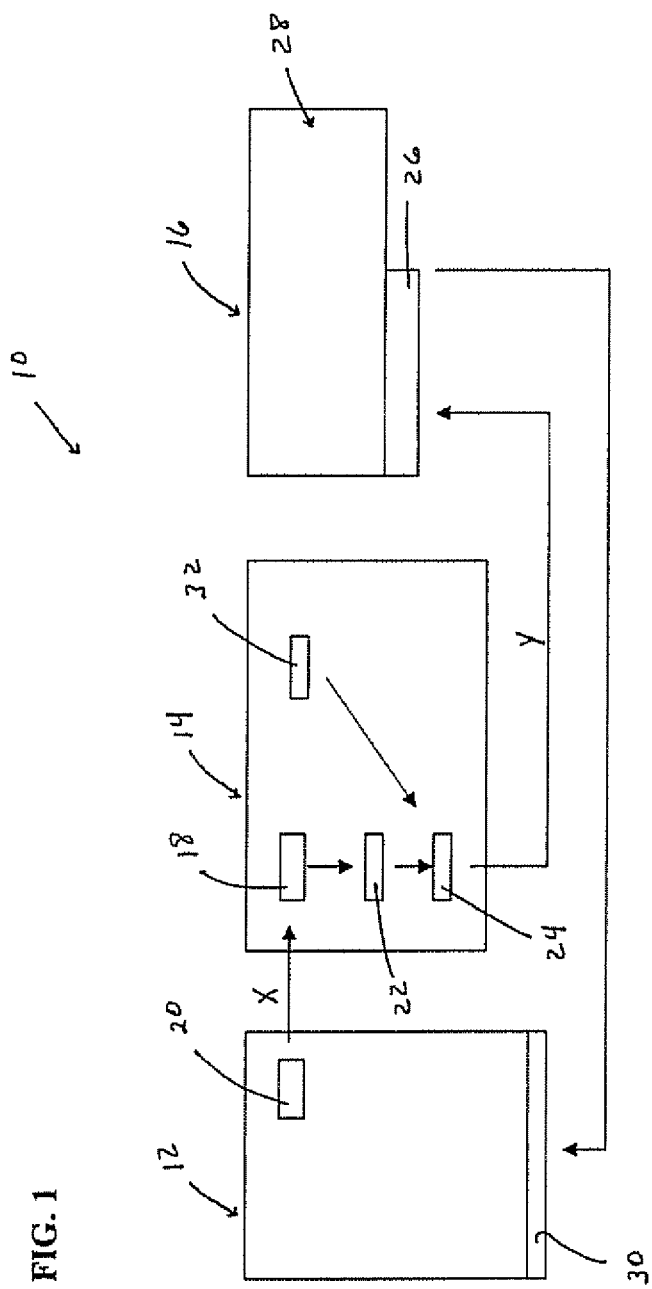
FIG. 1 is a schematic depicting an exemplary sanitizing system, wherein an exemplary appliance includes an exemplary air conditioning unit.

FIG. 1 depicts an exemplary sanitizing system. As shown in FIG. 1, a sanitizing system 10 comprises an air conditioning unit 12, a controller 14, and a biocide injection subsystem 16. In this embodiment, once air conditioning unit 12 starts running, i.e., when it begins the process of generating cold air, a receiver 18 of controller 14 receives a cool input X. Cool input X may be by way of a signal received from air conditioning unit 12, wherein in an especially preferred embodiment, cool input X is received from a thermostat 20 of air conditioning unit 12. Such a signal generally comprises a 24 volt alternating current. Once air conditioning unit 12 stops running or is stalled, i.e., when the air conditioner stops the process of generating cold air, cool input X to receiver 18 ceases. A time delay member 22 of controller 14, which is in operable communication with receiver 18, may then initiate a time delay of "X" seconds. Once the time delay has lapsed, an actuator 24 of controller 14 may then energize an output signal Y which is in operable communication with biocide injection subsystem 16. Via output signal Y, actuator 24 preferably either generates or transmits a 24 volt alternating current to a solenoid valve 26 which forms part of biocide injection subsystem 16. Output signal Y opens solenoid valve 26, thereby allowing biocide which is contained within a housing 28 of biocide injection subsystem 16 to flow from housing 28 and into a drain pan 30 of air conditioning unit 12. The biocide is preferably released in an amount that will disinfect the water cycle of air conditioning unit 12.

An output signal duration member 32 of controller 14, which is in operable communication with actuator 24, determines a set time point "Z" for which actuator 24 shall energize the output signal. Once "Z" is reached, the signal provided by actuator 24 to the output signal stops, solenoid valve 26 closes, and the flow of biocide from biocide injection subsystem 16 ceases.

Figure 2:
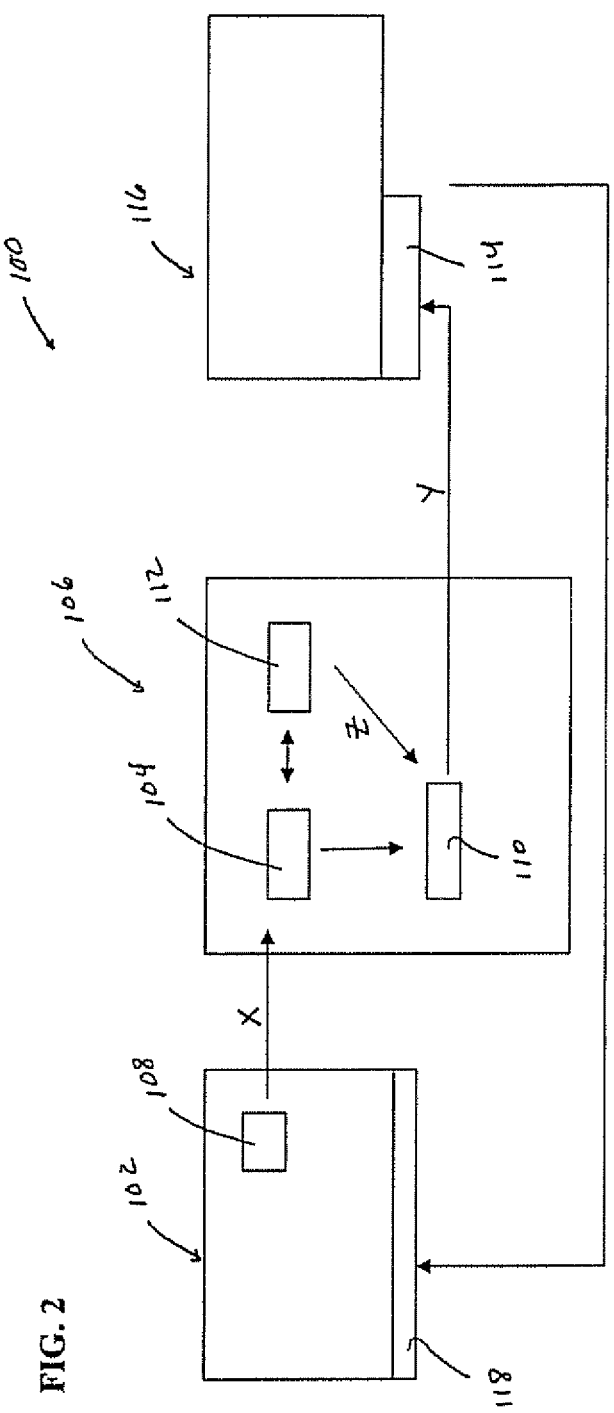
FIG. 2 is a schematic depicting an exemplary sanitizing system, wherein an exemplary appliance includes an exemplary reservoir humidifier unit.

In another exemplary embodiment, as shown in FIG. 2, a sanitizing system 100 may be functionally integrated with the operation of a reservoir humidifier unit 102, wherein reservoir humidifier unit 102 may be as conventionally known. In this embodiment, once reservoir humidifier unit 102 starts running, a receiver 104 of a controller 106 receives an input signal X from a humidifier fill valve 108, wherein input signal X may comprise a 24 volt alternating current. Once humidifier unit 102 stops running, input signal X ceases. An actuator 110 of controller 106, which is in operable communication with receiver 104, upon receiving a signal Z that the input signal has ceased and for a controlled period of time "T," as determined by an output signal duration member 112 of controller 106, energizes a humidifier output Y. Preferably, actuator 110 energizes the humidifier output with a 24 volt alternating current. The energized humidifier output Y actuates a solenoid valve 114 that controls the release of the biocide from a biocide injection subsystem 116 of sanitizing system 100. The biocide then flows through solenoid valve 114 and is injected into a water reservoir 118 of reservoir humidifier unit 102. The biocide sanitizes the stagnant water contained within water reservoir 118, as well as, the water contained within a pad which may be located in water reservoir 118 wherein such a pad is conventionally known. Once time "T" has been reached, actuator 110 ceases generating the humidifier output. Solenoid valve 114, consequently, closes, thereby preventing further flow of the biocide from biocide injection subsystem 116.

Figure 3:
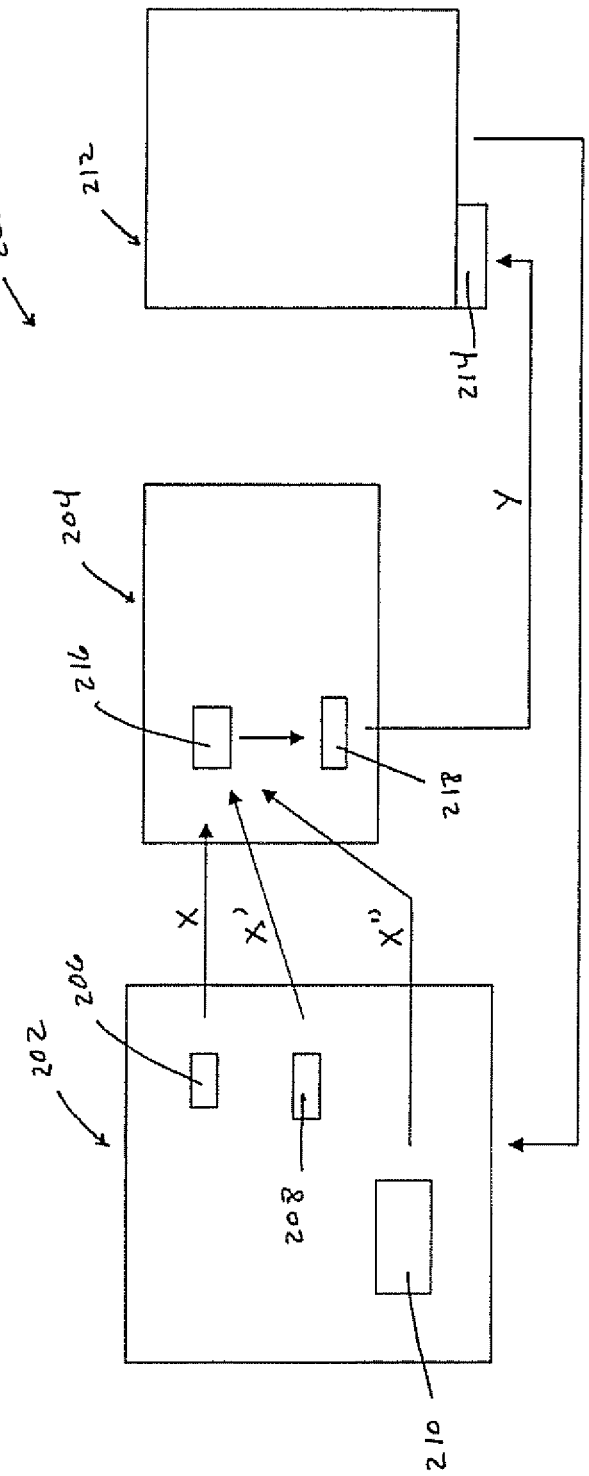
FIG. 3 is a schematic depicting an exemplary sanitizing system, wherein an exemplary appliance includes an exemplary HVAC subsystem.

FIG. 3 depicts an exemplary sanitizing system which may be functionally integrated with a conventionally known HVAC system. Referring to FIG. 3, a sanitizing system 200 comprises a standard HVAC subsystem 202, a controller 204, and a biocide injection subsystem 212. In this embodiment, the cooling output sequence may be accomplished with two cooling inputs, wherein the first cooling input X, which is generated by a thermostat 206, may be received by a controller 204 when HVAC subsystem 202 is running at a low speed, and the second cooling input X', which is generated by a thermostat 208, may be received by controller 204 when HVAC subsystem 202 is running at a high speed.

Where HVAC subsystem 202 includes a heat pump (cool actuated) subsystem, the output sequence generated by controller 204 may be initiated by at least one of first cooling input X and second cooling input X' in combination with a reversing valve input X", wherein reversing valve input X" is generated by a reversing valve 210. Reversing valve 210 reverses the flow of refrigerant through HVAC subsystem 202. For cooling, reversing valve 210 sends the coolant in one direction, and for heating, reversal valve 210 changes the direction of the refrigerant flow. Reversing valve 210 is cool actuated and, therefore, is an indicator of whether HVAC subsystem 202 is heating or cooling. Therefore, when a receiver 216 of controller 204 receives input from at least one of first and second cooling inputs X and X' and from reversing valve input X", receiver 216 can determine whether or not to transmit the signal to an actuator 218 of controller 204. When the signal is transmitted to actuator 218, the process of generating an output Y is initiated, wherein when output Y is generated by actuator 218, output Y is transmitted to a solenoid valve 214 of biocide injection subsystem 212.

Where HVAC subsystem 202 includes a heat pump (heat actuated) subsystem, the output sequence may be initiated when either or both of the first cool input and the second cool input is present. If either or both of the first and second cool inputs are received by the controller with a reversing valve input, the controller ignores the inputs and the controller does not energize the output.

Figure 4:
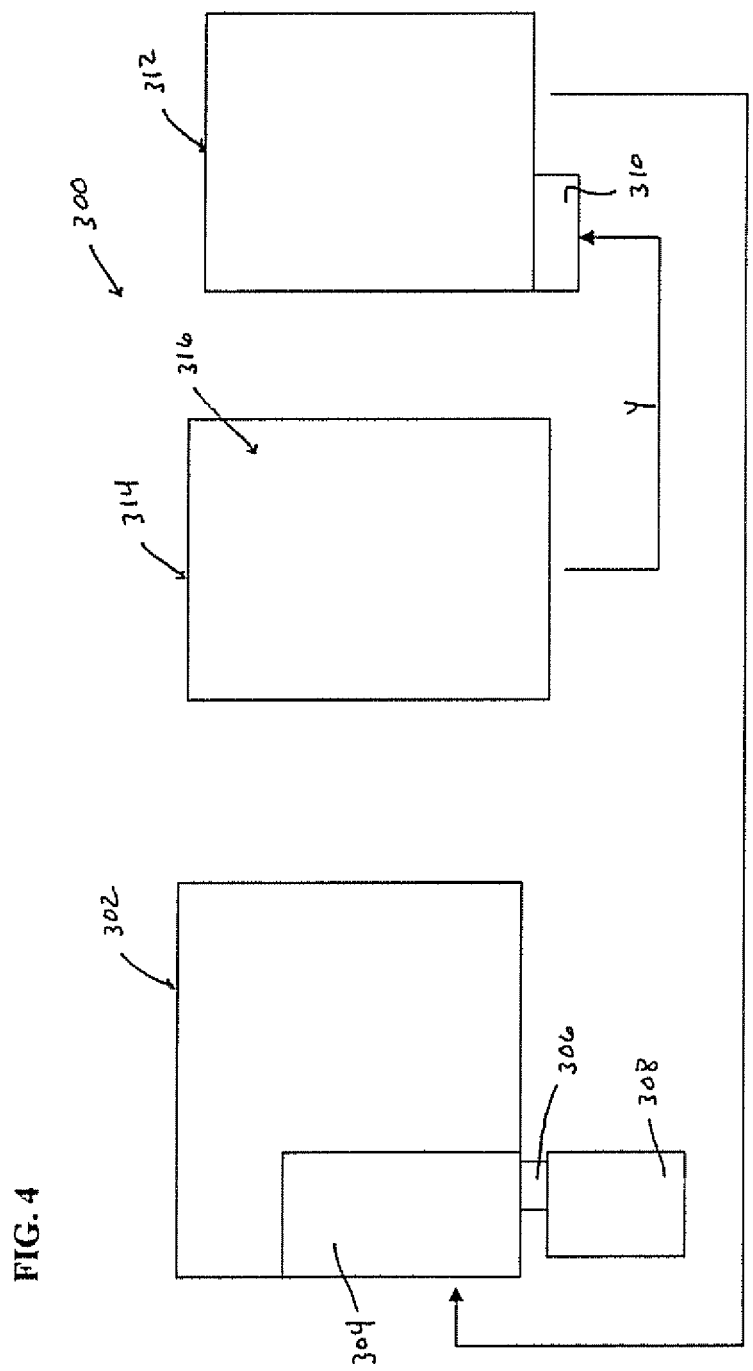
FIG. 4 is a schematic depicting an exemplary sanitizing system, wherein an exemplary includes another exemplary HVAC subsystem.

In another exemplary embodiment and as shown in FIG. 4, an exemplary sanitizing system 300 may be functionally integrated with a specially designed HVAC subsystem 302. In this embodiment, water from a recycler tank 304 pressurizes a humidifier fill valve 306. Humidifier fill valve 306, which is controlled by HVAC subsystem 302, consequently opens. Water flows through fill valve 306 and into a drain 308 which is routed back to recycler tank 304. A solenoid valve 310, which may be located on a biocide injection subsystem 312, is opened by an output signal Y generated by a controller 314. Controller 314 may open solenoid valve 310 on a routine schedule, or an operator may manually provide input signals to controller 314 via, e.g., push-buttons located on a housing 316, wherein the buttons are in electrical communication with controller 314. Once controller 314 transmits an output signal Y to solenoid valve 310, solenoid valve 310 allows for the emission of the biocide from injection subsystem 312 into recycler tank 304. Humidifier fill valve 306, which is controlled by HVAC subsystem 302, may then close, thereby halting further emission of the biocide from injection subsystem 312.

In any of the embodiments disclosed above, the controller may also include a regulating member the purpose of which is to set a maximum number of times in which the biocide is to be released from the biocide injection subsystem. For example, should the regulating member detect that the biocide has been released a certain number of times over the course of a particular period of time, the regulating member may prevent the opening of the solenoid valve at some point upstream of the solenoid valve. Therefore, in the case of a humidifier system, the regulating member may operate, e.g., on an "energize humidifier output for "x" seconds, not to exceed "w" cycles per hour" command. In the case of a cooling system, the regulating member may operate, e.g., on a "begin time delay "x" seconds, after which energizing cooling output for "z" seconds, not to exceed "w" cycles per hour."

In any of the embodiments disclosed herein, the controller may have at least one of the following components: a lockout timer, an over-activity member, a dormancy member, a re-set member, and a short call member.

The lockout timer tracks the treatment time of the condensate with the biocide, and depending upon such treatment time, prevents the release of further biocide amounts from the injection subsystem until a time to be determined by the controller. For example, if it takes X seconds to effectively treat a condensate with the biocide, if the off cycle of the HVAC appliance is greater than X seconds, then the controller will lock out the next biocide release for Y minutes.

The over-activity member comprises a circuit in a software program whereby, in the event that the appliance is overactive, and therefore, does not provide timely input signals to the controller, the controller will infiltrate the water cycle with a larger dosage of biocide than what would normally be supplied. Adding a larger volume of biocide to treat the water cycle addresses the fact that the appliance is overactive and needs to be treated while the appliance is running.

The dormancy member initiates the ejection of biocide in the case where the appliance has been dormant or stagnant for a predetermined amount of time, such as, e.g., a 7 day period in which the appliance has not run. Such treatment is effective during times when there is no new condensate production, such as, e.g., in the wintertime when outdoor temperatures are sufficiently cool.

In an exemplary embodiment, the re-set member is an added software feature which allows the controller to reboot if it freezes, or if a glitch occurs in the system.

In an exemplary embodiment, if the controller receives a cool input for less than a predetermined amount of time, a short call member will force the controller to ignore such cool input. This then, prevents the controller from mistakenly initiating the ejection of biocide in cases where such cool input likely was not a true signal from the appliance, but, rather was the result of some other effect, such as, e.g., wires actually touching one another. Therefore, the short call member improves the efficiency of the controller and ensures that the biocide is not wasted.

The components of the controller may be contained within a single housing, or one or more of the components may be contained in one or more housings separate from the other components of the controller. Additionally, the components of the controller need not be separate physical components, but are described as being functionally distinct, and, therefore, they may be contained and/or integrated within a single software program.

As has been discussed above-herein, the controller and the biocide injection subsystem may be incorporated functionally into a variety of appliances. Additional exemplary embodiments are further discussed below with reference to FIGS. 5-9.

Referring to FIG. 6, an exemplary sanitizing system 400 functionally integrates a controller 401 that receives a signal from a humidifier fill valve, and a biocide injection subsystem into an automated gravity-fed humidifying subsystem 402 (see FIG. 5) such as, e.g., the Aprilaire 400 humidifier, to form an automated gravity-fed humidifying assembly. Automated gravity-fed humidifying subsystem 402 comprises a humidifier housing 404 and a wicking pad 406. Generally, the water cycle flows through the force of gravity downwards through humidifier housing 404 and then rises to the top of humidifier housing 404 via wicking pad 406. Controller 401 direct-injects a pre-determined volume of liquid biocide from the biocide injection subsystem into a humidifier water reservoir 432 to sterilize humidifier housing 404 and pad 406, eliminating the risk of airborne diseases related to bacteria and virus growth from entering the air stream. Accordingly in this embodiment, the input to controller 401 is a signal 403 from the HVAC system that operates the humidifier, wherein exemplary signals may be emitted by the HVAC system's humidistat, thermostat with integral humidity control, and the like.

Sanitizing system 400 includes a storage tank 408 with a vacuum-vented screw-on lid 410 and a cone-bottom outlet port 420. Various tank types, shapes, sizes, and materials may be used. Different mounting methods may be used, including a holder 412 with disposable biocide containers. Storage tank 408 is located at an elevation above humidifier subsystem 402. Storage tank 408 may include a volume level indicator 414.

Sanitizing system 400 further comprises a strainer 416 which holds the biocide. Although strainer 416 may include a variety of types of strainers that serve the function of holding and releasing the biocide, in an exemplary embodiment, strainer 416 is in the form of a pouch, and suspended from lid 410 of storage tank 408. Alternatively, strainer 416 may be in the form of a basket inserted at the bottom of storage tank 408.

Sanitizing system 400 may further include a shutoff valve 418 which is inserted into a bottom outlet 420 of storage tank 408 which allows for the maintenance on parts downstream of shutoff valve 418 without having to drain storage tank 408. Shutoff valve 418 can be of any style or material.

Sanitizing system 400 may further include a hose clamp around a neck of an outlet port where the shutoff valve inserts, to prevent splitting and expanding of plastic housing over time. Any style connection and material will work, but threaded, hard piped pvc/plastic is most durable and reliable.

Sanitizing system 400 further may comprise a strainer/filter 422 that is inline with shutoff valve 418. Filter housing 422 is preferably parallel to ground, either to the left or right, and coming out of shutoff valve 418.

Sanitizing system 400 further may comprise a drain valve 424, in order to quickly drain or flush the upper components without having to manually drain through a controlled solenoid valve.

Sanitizing system 400 further may comprise a normally closed, gravity-feed rated 24 volt solenoid valve 426 after filter 422, wherein solenoid valve 426 is controlled by the controller as described, e.g., in any of the embodiments disclosed above herein. A male thread barb adapter may be connected to the discharge side of solenoid valve 426. A barbed tee positioned directly after barbed adapter may be connected via vinyl tubing. The tubing may vent, along with tubing from a side branch of the tee, to a level above a top of storage tank 408. The tubing can be of any material or size, but for pH reasons, vinyl or plastic is preferable. The fittings may be of any material and connection type (flare, push fittings, compression etc), but barbed plastic fittings are preferable for the discharge side of the solenoid valve Vinyl tubing 428 in the bottom of the tee will continue with the flow of gravity to a lower section of either side of humidifier housing 404.

A stainless steel 90-degree discharge tip 430 may penetrate the side of humidifier housing 404, and may be routed to humidifier reservoir 432. Discharge tip 430 may be of any material, including plastic. Discharge tip 430 may be of any length or angle. The flange for discharge tip 430 is preferably magnetic. The flange can mount to housing 404 in any fashion, such as screws, adhesive, Velcro, etc, but a quick release magnetic flange is more convenient and universal. A magnet may be placed on the inside of humidifier housing 404 directly on the other side of the magnetic flange, so that two magnets pull together and keep discharge tip 430 in place.

Sanitizing system 400 may include a low-level sensor 434 that provides an alert when the tank liquid level is low and requires refilling and/or service. In an exemplary embodiment, sensor 434 is wired to a control manufactured for relaying signals via the internet (wired or Wi-Fi) using text, emails, and the like. Sensor 434 preferably is positioned near the lower level of storage tank 408 to sense biocide levels. Although any low level sensor may be used, sensor 434 preferably includes at least one of a float type sensor, a floatless electronic sensor, an ultrasonic sensor, and the like.

Sanitizing system 400 may include an automatic biocide-stirring component, wherein the stirring component could be added to keep the solution evenly mixed, and may be controlled by controller circuits.

When sanitizing system 400 is in operation, after each heat cycle, controller 401 may energize solenoid valve 426 with 24 volts for a determined amount of time to deliver a determined amount of biocide at a determined concentration. Sanitizing system 400 can also be controlled by the humidifier fill cycles instead of the heat cycles, or on a periodical timer circuit. Additionally, controller 401 may control a time delay before energizing the solenoid valve 426.

Sanitizing system 400 may include low-level alarm terminals for low storage tank level sensor 434. Although a Wi-Fi alarm is preferred (to alert homeowner, caretaker, HVAC contractor, etc., the signal could be linked to any communication system, such as text, email, automated phone call, integration into the home's alarm system, etc); however, an indicator lamp, buzzer alarm, humidifier lockout function, refill signal function (to a tank refill valve), or any other indicator that can utilize a low level signal input will work as well.

Sanitizing system 400 also may include a manual button/switch etc to manually energize solenoid valve 426, opening solenoid valve 426 and allowing biocide to purge a system, or to test the functionality of solenoid valve 426.

Sanitizing system 400 is designed to utilize activated chlorine dioxide solution as a biocide. Any other biocide could be used in system 400, or in any of the embodiments disclosed herein, but for effectiveness and safety, low concentrations of a chlorine dioxide solution is preferred in system 400 and in the other embodiments disclosed herein. The volume of biocide solution is designed to dilute the water contained in reservoir 432 to low, safe, and effective levels to kill any virus, bacteria or fungal growth in housing 404. The dilute solution wicks up humidifier pad 406, and sanitizes the surface of pad 406 before the solution evaporates.

When storage tank 408 is empty, storage tank 408 preferably is refilled. As previously mentioned, low level sensor 434 and controller 401 could energize a valve or pump to refill storage tank 408 automatically. Alternatively, an automatic biocide tablet dispenser could be used to recreate biocide solutions in the water inside storage tank 408.

All of the components of sanitizing system 400, including controller 401, may be incorporated into a self-contained unit. Additionally, the order of the components and the specific location of the components may be augmented to achieve the same product and end result. For example, a screen could be inserted into the neck of the tank outlet instead of a filter housing below the tank, etc.

Figure 5:
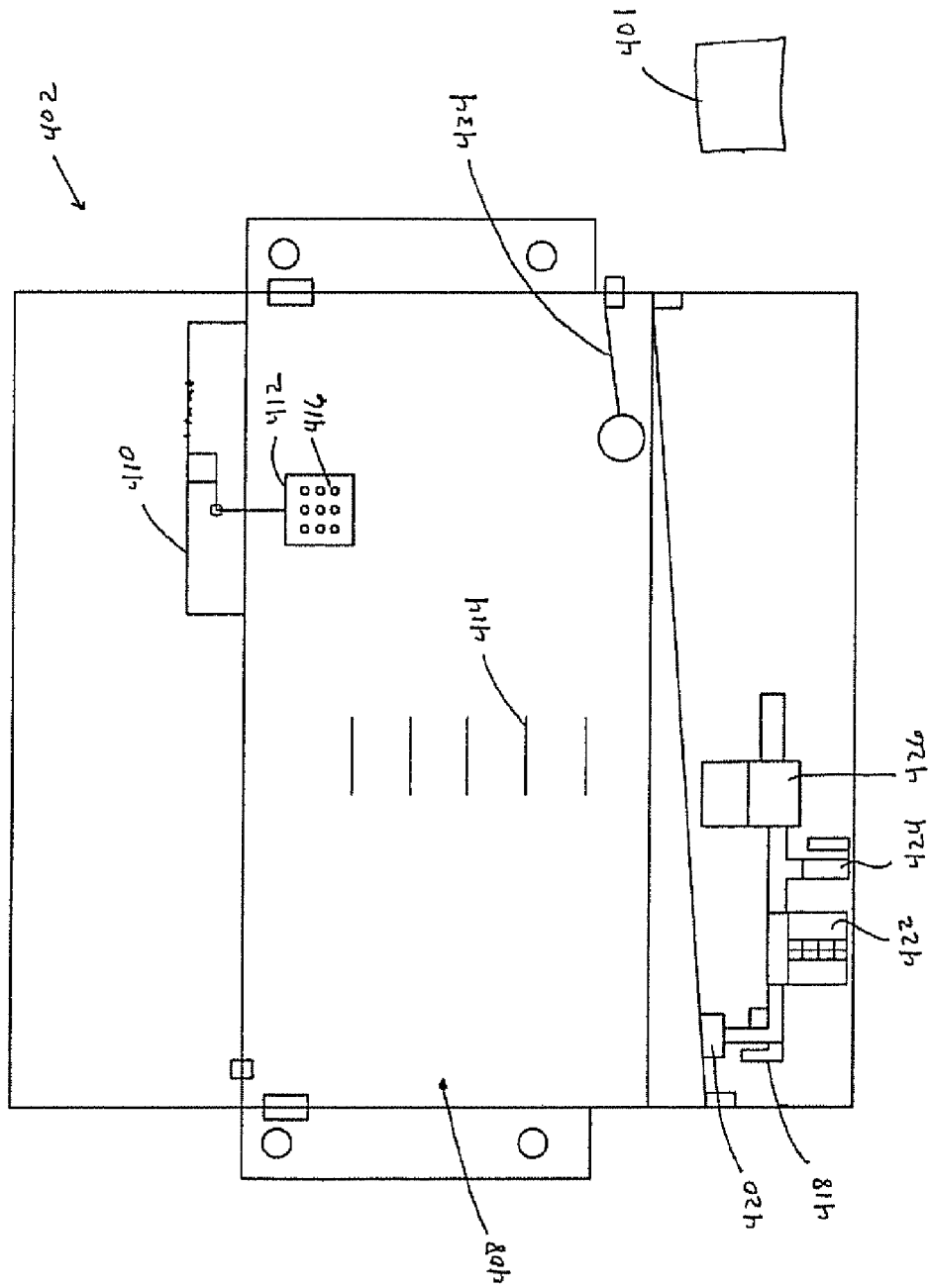
FIG. 5 is a schematic depicting an exemplary gravity feed storage tank.
Figure 6:
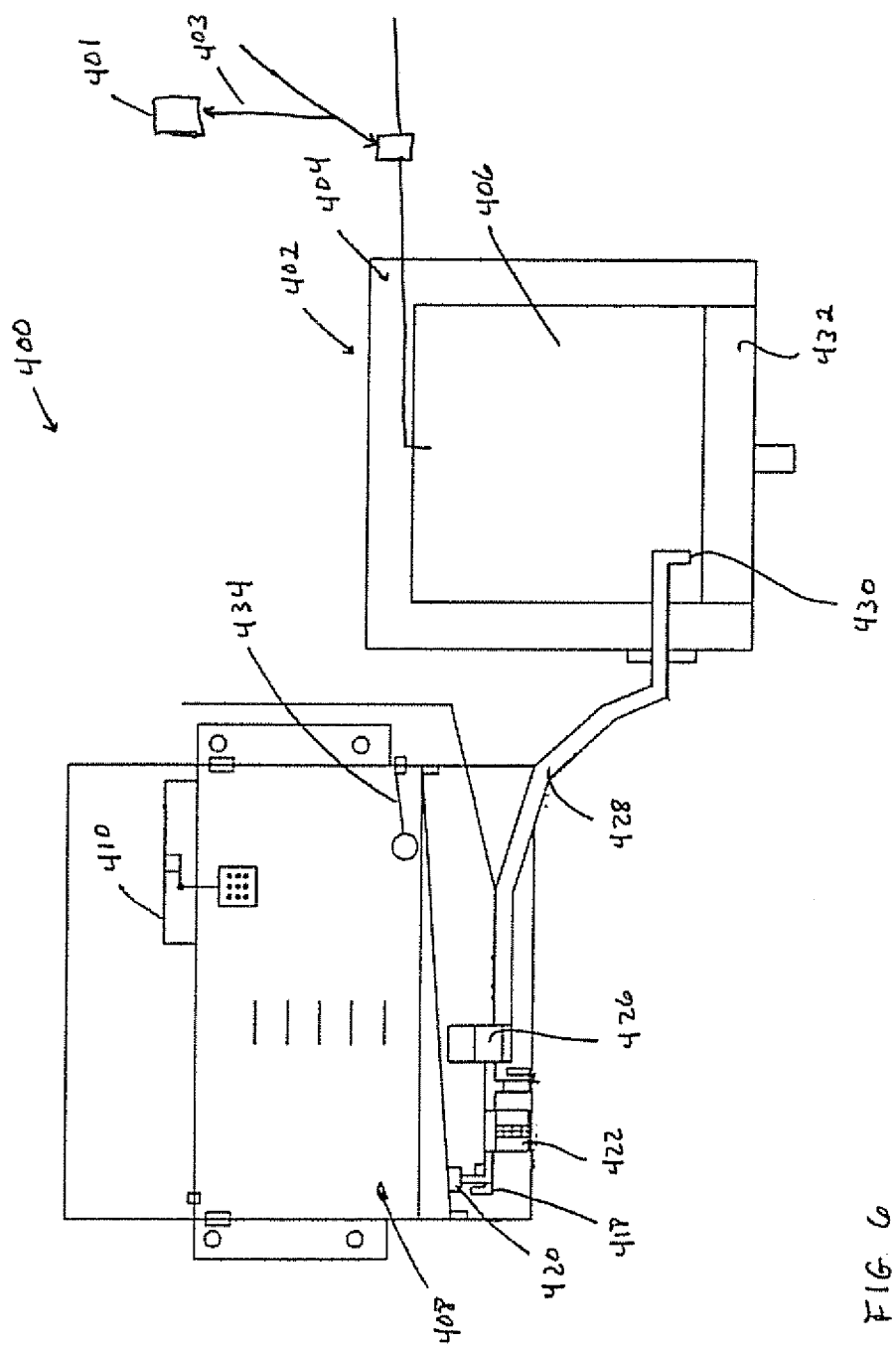
FIG. 6 is a schematic depicting an exemplary sanitizing system comprising the gravity feed storage tank depicted in FIG. 5 and an exemplary humidifier.
Figure 7:
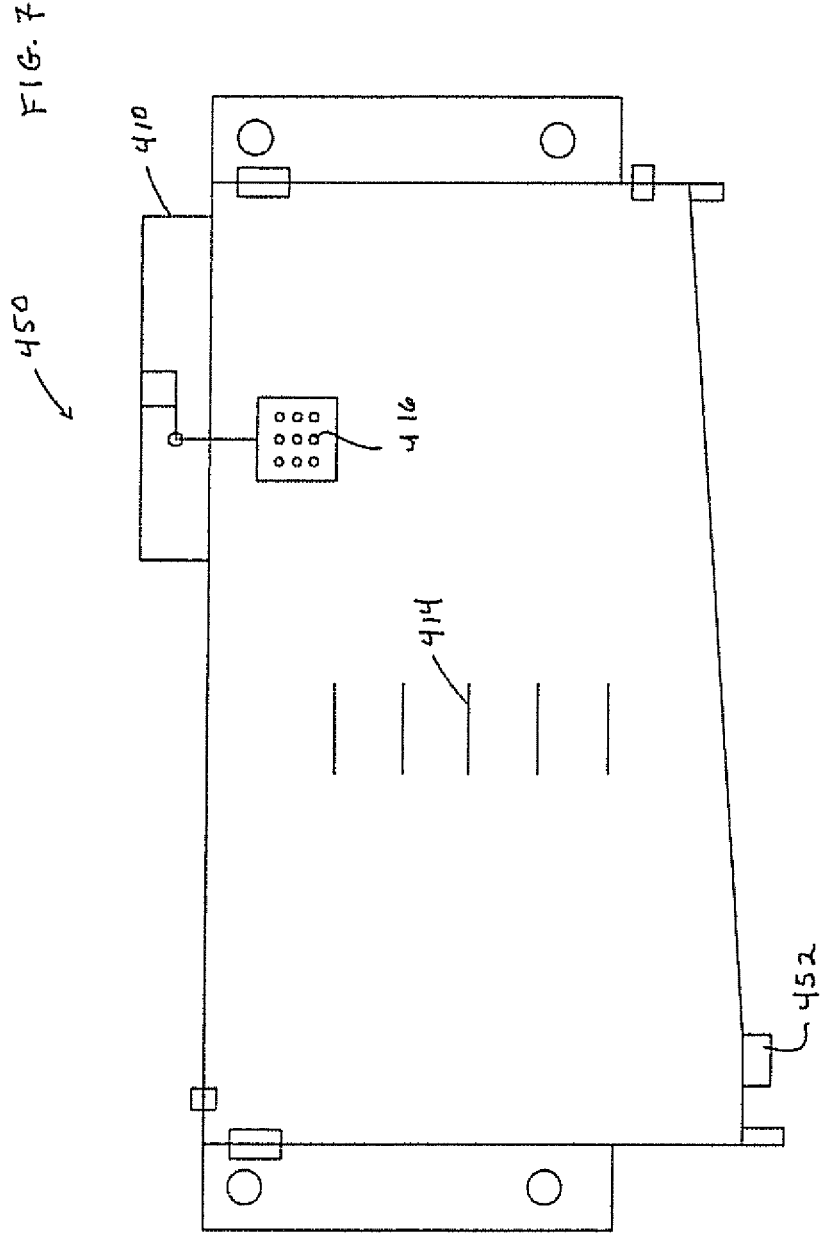
FIG. 7 is a schematic depicting an exemplary floor mounted storage tank.

For applications where a gravity fed storage tank, such as is depicted in FIG. 5, is not applicable, a rectangular, floor-mounted storage tank, such as is depicted in FIG. 7, could be placed on the ground (pitched slightly to one end) and a pump (diaphragm type best but others would also work) could be routed to a solenoid valve at the discharge tip that inserts into humidifier housing 404, allowing controlled delivery of said biocide into reservoir 432, without gravity, using the same control system as the gravity fed storage tank 402. The filter for the gravity application may be piped to the suction side of the pump, to filter the contents and sediment in storage tank 408. For best functionality, a constant pressure diaphragm pump with a check valve is preferably used to pressurize the line between storage tank 408 and the solenoid valve, and controller 401 will energize the solenoid valve for a determined amount of time to thereby release the biocide.

Figure 8:
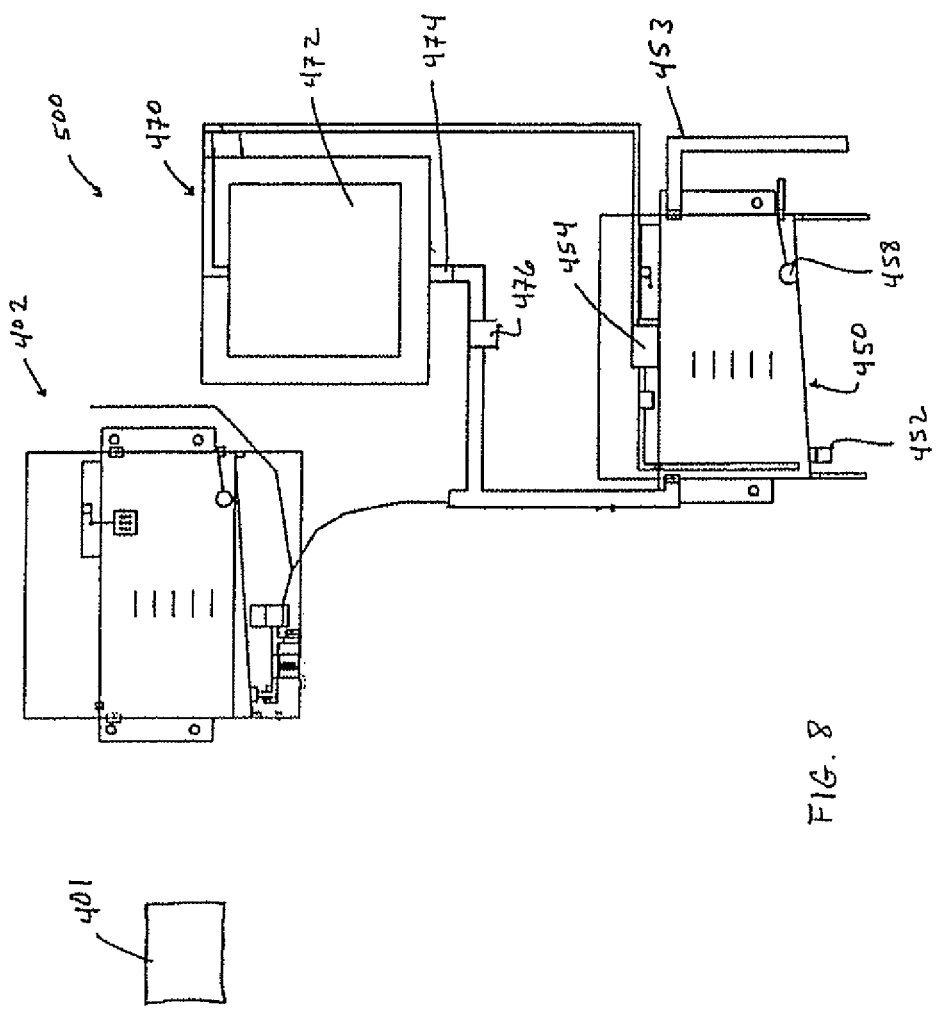
FIG. 8 is a schematic depicting an exemplary sanitizing system comprising the gravity feed storage tank depicted in FIG. 5, the floor mounted storage tank depicted in FIG. 7, and an exemplary humidifier.

Referring to FIG. 8, another exemplary sanitizing system 500 integrates a controller 401, wherein the input signal provided to controller 401 preferably is received from the existing HVAC system humidistat or any thermostat or control that is designed to operate a humidifier. Sanitizing system 500 further comprises a biocide injection subsystem. Controller 401 and the biocide injection subsystem are integrated into a flow through type humidifier 470, such as, e.g., the April Aire 600 humidifier. A flow through humidifier is the same as a reservoir type humidifier, but with a "waterfall effect" pad 472 and no reservoir, just a drain 474 that the un-evaporated water flows down. To properly treat flow-through humidifier 470 adequately and in the same manner as reservoir type humidifier 402, the components from gravity fed storage tank 402 may be combined with floor mounted storage tank 450 (see also FIG. 7). In this embodiment, a reservoir of water is needed to properly and safely treat humidifier 470. Accordingly, gravity fed storage tank 402 is preferably incorporated into sanitizing system 500.

As shown in FIG. 8, sanitizing system 500 includes storage tank 450. A float-type fill valve 458 may be mounted to the side of storage tank 450, with a float inserted inside. A house potable water supply may tie into this fill valve instead of the normal humidifier connection, filling the tank to a desired level with potable water. A bulk head style, or any suitable fitting, may be inserted into a side of tank 450 above the liquid level, or to the top of tank 450. A PVC pipe 452 may be connected to the previous mentioned fitting and piped to drain off flow-through on the bottom of humidifier 470. A filter 476 (which may be identical to the filter set forth in sanitizing system 400) may be piped inline from drain 474 to the storage tank connection. A tee may be piped after the filter with a branch facing up, and an extension may be inserted into the tee. A pipe connecting discharge of storage tank pump 454 to humidifier feed tray inlet piping (where potable feed normally would tie in). Ideally, the humidifier water feed valve would be removed and discarded and the water flow would be driven by pump 454. Methods utilizing the humidifier water fill valve and alternate pressure type pumps, would also adequately serve the purpose. A pipe 453 may be inserted into the side of tank 450—above the normal fill level—to act as a safety overflow in the event that tank 450 overfilled, and may be piped to a drain or drain pump.

The storage tank, and all other components from the gravity-fed application, are located at an elevation above the drain tee. The function of this component may be the same as previously described, but the discharge from the solenoid valve on the gravity tank dumps into the tee on the drain line, after the filter from the humidifier drain. The controller can energize this valve to deliver enough biocide to properly sterilize a volume of water in the ground storage tank, which will get pumped through the pump lines, accumulator, and humidifier housing.

Another exemplary sanitizing system 600 is depicted in FIG. 9. Here, controller 401, a biocide injection subsystem, and gravity fed storage tank 402 is integrated with a central air conditioning system/permanent dehumidifier 602. The input signal to controller 401 is preferably initiated by the HVAC system thermostat, appliance dehumidistat, a simple timer, and the like. In this embodiment, sanitizing system 600 may include substantially identical components and functions as sanitizing system 400, and the functionality of the controller may work in a substantially identical manner. Sanitizing system 400, however, unlike sanitizing system 600, is controlled by a cooling system instead of heat.

Referring to FIG. 9, a discharge tip 502 is inserted into an air conditioning unit evaporator housing 504 to allow biocide discharge to flow by gravity down a drain pan subassembly inside housing 504. The biocide flows through a pan 508, a pan outlet 510, and a condensate drainage subsystem 512. Discharge could also be designed to treat the evaporator coil itself, and then drain into drain pan, achieving the same result but with coil sanitation as well. The dehumidifier assembly is identical; both units have the same components being treated.

The condensate collected can be safely treated, and instead of a condensate pump pumping it down the drain, the non-gravity application components could collect the condensate, and using the diaphragm pump, clean condensate could be piped under pressure to a drip-type irrigation system, toilet, traps that need periodic priming, and any other application where water could be reused in this manner. A float switch may be used to trigger the pump.

Another exemplary embodiment includes an application for the integration of the sanitizing system into a heat recovery ventilator. In this embodiment, the apparatus may include substantially identical components and functions as the reservoir-type humidifier application (gravity-fed). The apparatus may further include a substantially identical controller and controller functions as described in the above-mentioned applications, but this application is preferably controlled by a 24-hour timer. The discharge tip may be inserted into a side of the ventilator to discharge the biocide into the drain pan and the trap of the ventilator preventing growth inside unit and airborne spores from entering air stream of house. Preferably, the biocide is injected at least once a day. Alternatively, the water cycle may be treated in the same manner with the non-gravity application components The controller circuits for each assembly may be combined into one controller, with all functions, and gravity-fed or non-gravity assemblies can have multiple solenoids piped in parallel to serve multiple assemblies with a single storage tank In further embodiments, aspects of the sanitizing system may be implemented in whole, or in part, in support of operation of portable humidifiers, portable dehumidifiers, portable air conditioners, mini-split units, window air conditioners, irrigation systems/storage, water storage, all previously mentioned equipment on, e.g., RV's, cars, boats, cruise ships, freezer/cooler trucks etc., fridge/freezer appliances (mobile carts, coolers, ice cream machines, anything involving cooling will have drain pan and drain, either on the food side or cooling side or both), ice machines (ice reservoir, drain pan and drain for ice melt drainage), any other moisture/air contact related appliances or systems, drainage systems (problem indirect waste traps, or floor drains, for example), individual components of any drainage/condensate system (e.g., condensate pump, trap, etc), cooling towers, all above mentioned applications, in residential, commercial, and industrial applications, any process or system that needs periodic treatment of stagnant water, any odor-related systems/appliances/devices/applications (ex disposals, porta-pottys), any application that can use recycled condensate to function, ex toilet flushing, garden watering, etc.

It is noted that in any of the embodiments disclosed herein, the system may be adapted to a single device that would include one or more of the components disclosed herein, and which would serve the same purpose as having multiple subsystems and parts.

Various other components may be included and called upon for providing for aspects of the teachings herein. For example, additional materials, combinations of materials and/or omission of materials may be used to provide for added embodiments that are within the scope of the teachings herein.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sanitizing system comprising:
an appliance having a water cycle;
a controller comprising a receiver, an actuator, and a time delay member;
a biocide; and
a biocide injection subsystem;
wherein the appliance generates and transmits an input signal to the receiver of the controller when the appliance is actively running, wherein the input signal is based upon the active running of the appliance, and further wherein, when the appliance is not actively running, the input signal to the receiver ceases, thereby causing the time delay member, which is in operable communication with the receiver and the actuator, to initiate a time delay of X seconds, wherein the actuator energizes an output signal once the time delay of X seconds has passed, wherein the output signal actuates the biocide injection subsystem to release the biocide into the water cycle of the appliance.

2. The sanitizing system of claim 1, wherein the appliance comprises an air conditioning unit having a thermostat, and wherein the input signal is a cooling input signal, wherein the cooling input signal is generated and transmitted when the air conditioning unit is generating cold air and is based upon the generation of cold air by the air conditioning unit, and ceases when the air conditioning unit stops generating cold air, and wherein the thermostat transmits the cooling input signal to the receiver of the controller.

3. The sanitizing system of claim 2, wherein the air conditioning unit further comprises a drain pan, wherein the biocide flows from the injection subsystem and into the drain pan when the biocide is released into the water cycle of the air conditioning unit.

4. The sanitizing system of claim 1, wherein the appliance comprises a humidifier having a fill valve, wherein the fill valve transmits the input signal to the receiver of the controller when the humidifier is actively running, and further wherein the input signal is based upon the active running of the humidifier.

5. The sanitizing system of claim 4, wherein the humidifier further comprises a water reservoir, wherein the biocide flows from the injection subsystem and into the water reservoir when the biocide is released into the water cycle of the humidifier.

6. The sanitizing system of claim 1, wherein the biocide injection subsystem comprises a solenoid valve, wherein the output signal opens the solenoid valve to thereby cause the release of the biocide into the water cycle of the appliance.

7. The sanitizing system of claim 6, wherein the output signal comprises a 24 Volt alternating current.

8. The sanitizing system of claim 1, wherein the controller further comprises an output signal duration member which is in communication with the actuator member, wherein the output signal duration member transmits a shut down signal to the actuator after a time Y, wherein the shut down signal causes the actuator to stop generating the output signal which in turn stops further release of the biocide into the water cycle of the appliance.

9. The sanitizing system of claim 8, wherein the controller further comprises a regulating member located upstream of the biocide injection subsystem, wherein the regulating member sets a maximum number of times in which the biocide is to be released from the biocide injection subsystem, and further wherein the regulating member restricts the release of the biocide from the biocide injection subsystem when the regulating member senses that the release of the biocide from the biocide injection subsystem has exceeded the maximum number of times in which the biocide is to be released from the biocide injection subsystem.

10. The sanitizing system of claim 9, wherein the controller further comprises a lockout timer, wherein the lockout timer is in communication with the actuator, and further wherein the lockout timer blocks the output signal generated by the actuator from reaching the biocide injection subsystem for a pre-set amount of time, wherein the pre-set amount of time is based upon a treatment time of the biocide once placed into the water cycle.

11. The sanitizing system of claim 9, wherein the controller further comprises an over-actively member which is in communication with the receiver of the controller, wherein the over-activity member regulates the amount of biocide that is released from the biocide injection subsystem.

12. The sanitizing system of claim 9, wherein the controller further comprises a dormancy member, wherein the dormancy member stimulates the actuator to generate and transmit an output signal to the biocide injection subsystem when a preset amount of time has lapsed since the actuator last generated and transmitted the output signal to the biocide injection subsystem.

13. The sanitizing system of claim 1, wherein the controller further comprises a short call member, wherein the short call member determines a length of time of the input signal, and based upon the length of time, wherein the short call member blocks the input signal from being transmitted to the receiver.

14. A sanitizing system comprising:
a heating, ventilation, and air-conditioning subsystem comprising:
a first thermostat and a second thermostat, wherein the first thermostat generates a first cooling input when the subsystem is running at a first speed wherein the first cooling input is based upon the subsystem running at the first speed, and the second thermostat generates a second cooling input when the subsystem is running at a second speed wherein the second cooling input is based upon the subsystem running at the second speed, wherein the second speed is faster than the first speed; and a reversing valve, wherein the reversing valve generates an input signal when the reversing valve is cool actuated, wherein the input signal is based upon the cool actuation of the reversing valve;

a controller comprising a receiver and an actuator, wherein the receiver receives the first cooling input from the first thermostat when the subsystem is running at the first speed, the second cooling input from the second thermostat when the subsystem is running at the second speed, and the input signal from the reversing valve when the reversing valve is cool actuated, and further wherein the controller determines, based upon the first and second cooling inputs and the input signal, whether to generate and transmit a secondary input signal to the actuator, wherein upon receipt of the secondary input, the actuator then generates an output signal;

a biocide; and a biocide injection subsystem, wherein the biocide injection subsystem causes the flow of biocide into the heating, ventilation, and air-conditioning subsystem based upon the output signal generated by the actuator of the controller and transmitted to the biocide injection subsystem by the actuator.

\* \* \* \* \*